United States Patent [19]

Morimoto

[11] Patent Number: 4,625,446

[45] Date of Patent: Dec. 2, 1986

[54] DETECTOR FOR DETECTING A BIT OF A FISH

[75] Inventor: Shinichi Morimoto, Nishinomiya, Japan

[73] Assignee: Shimano Industrial Company Limited, Osaka, Japan

[21] Appl. No.: 831,612

[22] Filed: Feb. 21, 1986

[30] Foreign Application Priority Data

Mar. 4, 1985 [JP] Japan .............................. 60-30437[U]

[51] Int. Cl.⁴ ............................................. A01K 93/00
[52] U.S. Cl. .......................................... 43/17; 43/17.1
[58] Field of Search .............................. 43/16, 17, 17.1

[56] References Cited

U.S. PATENT DOCUMENTS

| | | | |
|---|---|---|---|
| 3,382,598 | 5/1968 | Wilson | 43/17 |
| 3,461,592 | 8/1969 | Makino | 43/17.1 |
| 4,021,957 | 5/1977 | Gleason | 43/16 |
| 4,437,255 | 3/1984 | Reed | 43/17 |
| 4,516,348 | 5/1985 | Hirose et al. | 43/17 |

*Primary Examiner*—M. Jordan
*Attorney, Agent, or Firm*—Stevens, Davis, Miller & Mosher

[57] ABSTRACT

The detector is mounted on a fishing line carrying a fish-hook and includes a fish-bite detection sensor operable in response to pressure applied by a fish's mouth on a worm rigged onto the fish-hook. The detector includes an oscillator disposed near the fish-hook, which outputs a signal in response to actuation of the sensor, and a receiver disposed away from said fish-hook, thus enabling an angler on the shore to detect that a fish has bitten the worm.

5 Claims, 8 Drawing Figures

DETECTOR FOR DETECTING A BIT OF A FISH

FIELD OF THE INVENTION

The present invention relates to a detector for detecting a bite of a fish, which is mounted on a fishing line carrying a fish-hook, and more particularly, to a detector for detecting a bite of a fish, by which an angler on the shore can detect that a fish has bitten an artificial worm rigged on the fish-hook.

BACKGROUND OF THE INVENTION

Conventionally, an angler using an artifical worm rigged onto a fish-hook detects a bite of a fish, such as a black bass, by sensing through his fingers vibrations transmitted from the line.

He draws to his side the worm in a manner of dancing it like a live bait on or below the surface of the water, thereby provoking the fish's appetite, so that he hooks the fish instantaneously when it bites the worm.

A fish such as a black bass, however, has the habit of disgorging the bait immediately when it finds that the bait is a foreign object, such as a worm. Hence, it is required to instantly strike the fish at the exact time when the fish bites the worm. However, for unskilled anglers, it is difficult to do so, thus reducing expectations of a good catch.

SUMMARY OF THE INVENTION

An object of the present invention is to provide a detector for detecting a bite of a fish, which electrically detects that a fish, such as a black bass, is biting the worm, thereby enabling the angler to pull the fishing line without delay so as to ensure the catch.

The present inventor has observed that the worm, when bitten by a fish, such as a black bass, is subjected to a predetermined pressure from the fish's mouth. Hence, the detector of the invention electrically detects such pressure and generates a detection signal, so that the angler strikes the fish on the basis of the detection signal, resulting in that even an unskilled angler ensures an easy catch.

The detector of the invention, which is mounted on the fishing line carrying the fish-hook and detects that a fish is biting the worm, is characterized by providing a fish-bite detection sensor operable responsive to pressure of the mouth of a fish which bites the worm rigged on the fish-hook, an oscillator electrically connected to the sensor and for outputting a signal responsive to actuation of the sensor, and a receiver for receiving the output signal from the oscillator. The oscillator includes a power source and is disposed in the vicinity of the fish-hook, and the receiver is disposed away from the fish-hook.

In the detector of the invention, the fish-bite detection sensor, when the fish bites the worm, operates to output a signal and then send it to the oscillator. The oscillator in turn emits radio or ultrasonic waves. The receiver receives these waves and informs the angler that the fish has bitten the worm. Hence, the angler pulls the line to his side and strikes the fish due to the information from the receiver, thereby expecting a good catch.

The above and further objects and novel features of the invention will be more fully apparent from the following detailed description when the same is read in connection with the accompanying drawings.

DETAILED DESCRIPTION OF THE INVENTION

Figure 1:
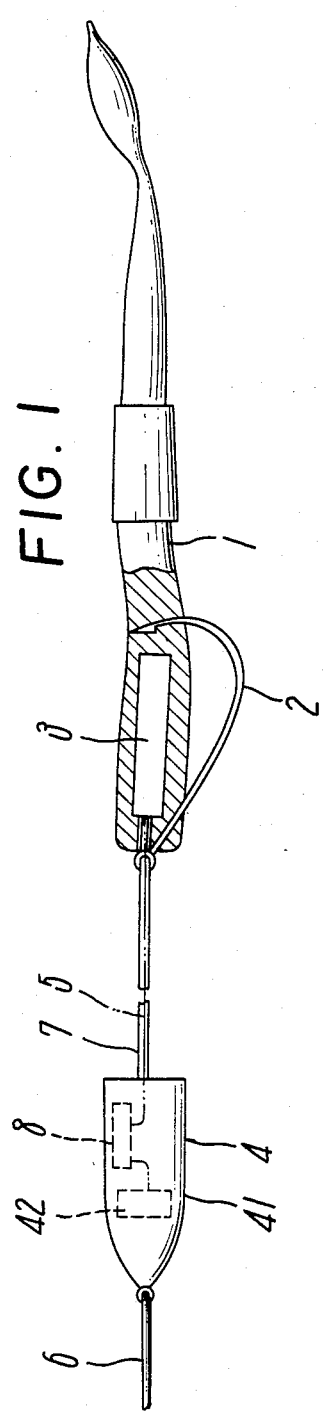
FIG. 1 is a partially cutaway side view of a first embodiment of a detector according to the invention for detecting a bite of a fish.

Referring to FIG. 1, a first embodiment of a detector according to the invention for detecting a bite of a fish, which is applied to a fishing line 6 carrying at one end a fish-hook 2 rigging thereon a worm 1 formed mainly of a soft material.

A fish-bite detection sensor 3 operable under pressure from the mouth of a fish biting the worm 1 is provided at the line near the hook 2, in other words, within the worm 1.

An oscillator 4 connected electrically to the detection sensor 3 through a wire 5 is provided to receive an output signal from the sensor 3, and emits radio waves or ultrasonic waves.

Specifically, as shown in FIG. 1, the detection sensor 3 is embedded within the worm 1 and near the hook 2 and the oscillator 4 is connected to the sensor 3 at a position spaced apart therefrom by a predetermined distance through a connector 7 formed of a flexible material and supporting the wire 5. The fishing line 6 is connected at its end with oscillator 4.

Also, the oscillator 4 comprises an oscillation unit 42 and a power source 8, such as button cells, which are housed in a watertight casing 41.

In the first embodiment, the worm 1, which is spaced from the oscillator 4 through the connector 7, moves in a natural manner on or below the surface of the water.

Figure 2:
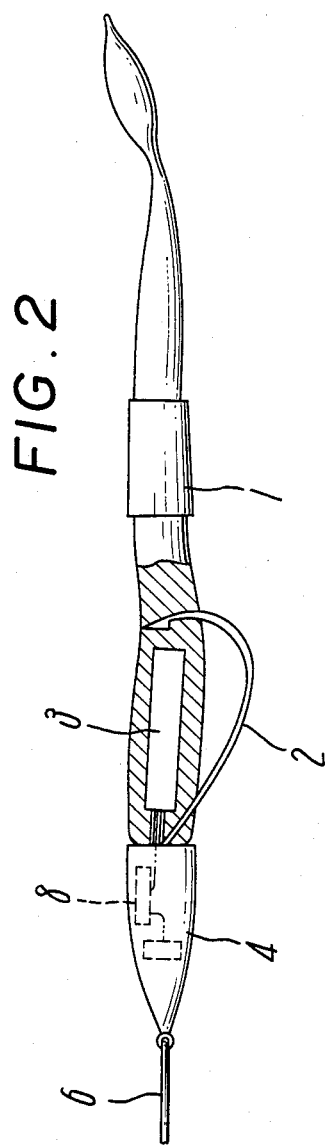
FIGS. 2 and 3 are partially cutaway side views of second and third embodiments of the invention.

In the second embodiment in FIG. 2, the oscillator 4 is mounted integrally on the worm 1 containing therein the sensor 3, the oscillator 4 and sensor 3 being electrically connected directly through the wire 5, thereby facilitating handling and casting of the worm 1.

Figure 3:
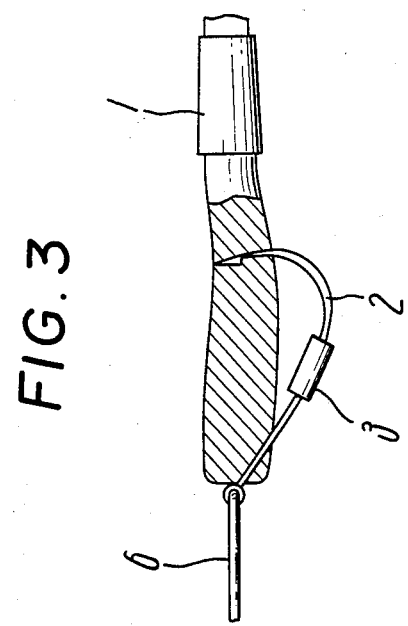

In the third embodiment in FIG. 3, the sensor 3 is not embedded in the worm 1 but mounted on the fish-hook 2 exposed from the worm 1. Alternatively, the oscillator 4 (not shown) may be integral with the sensor 3.

Also, the sensor 3 employs, for example, a common switch using two conductors, a contactless switch using pressurized conductive rubber, or a pressure sensor switch using a piezoelectric material.

Figure 4:
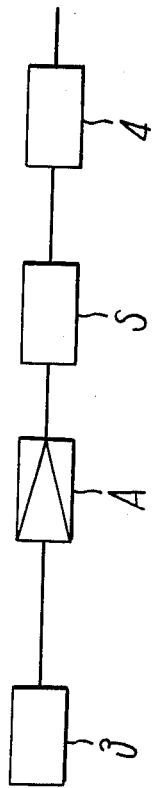
FIG. 4 is a block diagram of the detector of the invention.

The detection sensor 3, when the fish bites the worm 1, outputs a signal and the oscillator 4 emits radio waves or ultrasonic waves on the basis of the output signal as shown in a block diagram in FIG. 4.

In FIG. 4, the detection sensor 3 employs a piezoelectric switch. An amplifier circuit A and a shaping circuit S are interposed between the detection sensor 3 and the oscillator 4, with the shaping circuit S serving to shape the pulse signal detected by and output from the piezoelectric switch, thereby generating the signal for actuating the oscillator 4. Where a contactless switch is used as the sensor 3, the shaping circuit S is not indispensable.

Figure 5:
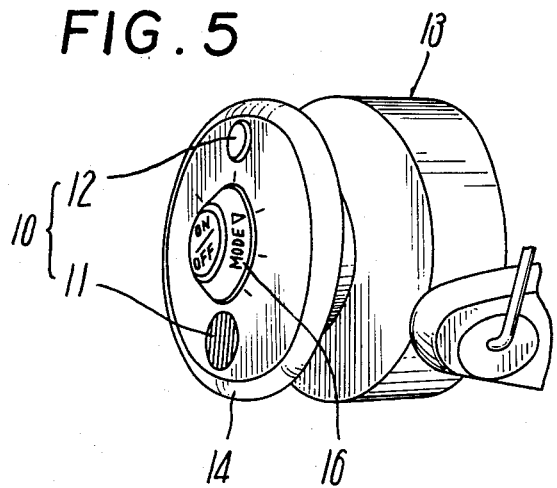
FIG. 5 is a partially omitted perspective view of an example of a receiver mounted on a fishing reel.
Figure 6:
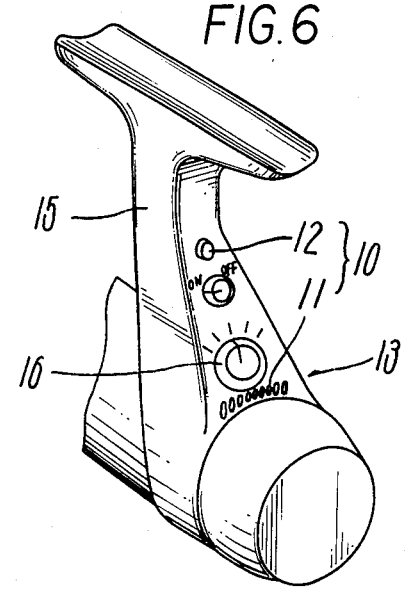
FIG. 6 is a partially omitted perspective view of another example of a receiver mounted on the fishing reel.

The detector of the invention is provided with a receiver 10 having a buzzer 11 and an indicating lamp 12 and receiving the radio waves or ultrasonic waves emitted from the oscillator 4 so as to inform the angler that a fish has bitten the worm 1. The receiver 10, as shown in FIG. 5, is attached to a spool 14 at a fishing reel 13 mounted on a fishing rod, or as shown in FIG. 6, attached to a mounting leg 15 at the reel 13. Alternatively, the receiver 10 (not shown) may be mounted on a reel body of reel 13, one of a pair of side frames of a double bearing reel, a stay between the side frames thereof, or a thumb rest, the invention being not particularly defined or limited with respect to the position at which receiver 10 is mounted. In addition, for example, the receiver 10 may be contained in the angler's pocket, or may be mounted on a buoy floating on the surface of the water. In addition, the receiver 10 floating on the surface of the water is at the interface between the water and the air to avoid being affected by attenuation or refraction of the radio or ultrasonic waves, thus ensuring that the angler will receive information of the sound or the light from the receiver 10. Also, the receiver 10 is advantageous in that its size is not limited. Alternatively, a receiver having no buzzer or lamp may be provided on the buoy and the buzzer or lamp may be provided at the reel. Hence, even when numerous anglers are fishing, it is easy to distinguish whose receiver is outputting the information signal.

In order to improve the receiving capacity of the receiver 10, an antenna therefor may be incorporated in the fishing rod, or a long cord as an antenna may be put at one end into the water.

The respective receivers 10 in FIGS. 5 and 6 are provided between the buzzer 11 and the lamp 12 with a dial 16 for selecting the frequency of the radio or ultrasonic wave from the oscillation 4.

Figure 7:
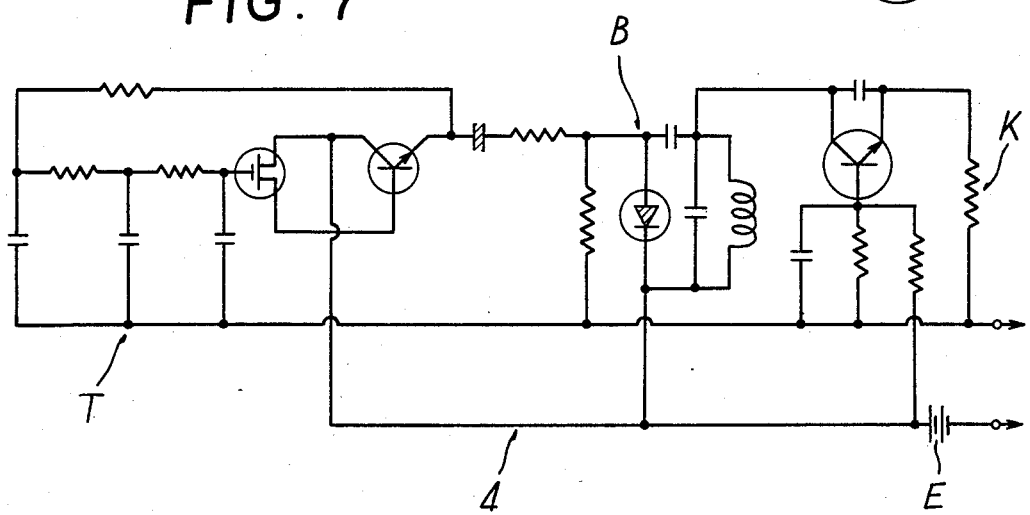
FIGS. 7 and 8 are electric circuit diagrams of oscillators associated with the detector of the invention respectively.
Figure 8:
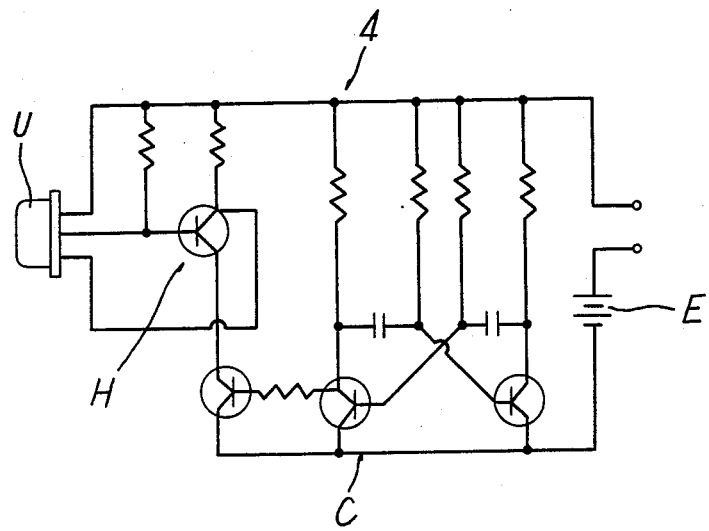

Also, the oscillator 4 is constructed in an electric circuit as shown in FIG. 7 or 8 in order to prevent a malfunction of the detector caused by interference between the radio waves or the ultrasonic waves when a number of anglers are fishing by use of the detectors.

Referring to FIG. 7, an electric circuit diagram of the oscillator 4 is shown, in which a circuit connected to a power source E is connected with a low frequency oscillation circuit T, a high frequency oscillation circuit K and a varicap circuit B, thereby forming a modulation circuit. The varicap circuit B has a variable capacitance which serves to modulate the radio waves output from the high frequency circuit K. Receiver 10 can identify the oscillator 4 by use of the low frequency carried on the radio wave, thereby preventing interference between the detectors.

FIG. 8 contains a circuit diagram of the oscillator 4 emitting the ultrasonic waves. A circuit connected to a power source E is connected with an ultrasonic wave oscillation circuit H, an adjusting circuit C variably adjustable of the ultrasonic waves output from the oscillation circuit H, and an ultrasonic wave oscillation unit U. The adjusting circuit is adjusted to cause intermittent ultrasonic waves to be output from the ultrasonic wave oscillation unit U, thereby distinguishing each oscillator 4 by the intermittence time at the receiver 10 side.

The detector, according to the invention, for detecting a bite of a fish, constructed as described above, provides an output signal from the detection sensor 3 when the fish bites the worm 1. Then oscillator 4 emits radio or ultrasonic waves on the basis of this output signal, and the receiver 10 receives these waves to inform the angler that a fish has bitten worm 1. Hence, the angler strikes the fish on the basis of the information from the receiver 10.

As seen from the above, the detector of the invention for detecting a bite of a fish, constructed as described above can immediately inform the angler that a fish has bitten worm 1, thereby enabling even an unskilled angler to hook the fish easily and reliably.

Although several embodiments of the invention have been described, they are merely exemplary of the invention and not to be constructed as limiting, the invention being defined solely by the appended claims.

What is claimed is:

1. A detector for detecting a bite of a fish, on a fishing line, said detector comprising:
   a fish-bite detection sensor for sensing a pressure caused by a bite of said fish on at least one of a fish-hook connected to said fishing line and a bait rigged on said fish-hook to thereby detect a bite of said fish,
   an oscillator electrically connected to said sensor for emitting an output signal responsive to said sensor sensing said pressure, said oscillator being disposed in the proximity of said fish-hook and including a power source,
   a receiver for receiving said output signal from said oscillator, said receiver being disposed away from said fish-hook.

2. A detector for detecting a bite of a fish as set forth in claim 1 wherein said sensor is embedded in a worm rigged on said fish hook.

3. A detector for detecting a bite of a fish as set forth in claim 1, wherein said sensor and oscillator are separate from each other and connected with each other through a connector.

4. A detector for detecting a bite of a fish as set forth in claim 1, wherein said sensor and oscillator are integral with each other.

5. A detector for detecting a bite of a fish as set forth in claim 1, wherein said sensor is mounted on said fish-hook.

* * * * *